United States Patent [19]

Kawamura et al.

[11] 4,403,260
[45] Sep. 6, 1983

[54] AUTOMATIC TAPE STOP DEVICE FOR VIDEO SIGNAL RECORDING AND REPRODUCING APPARATUS

[75] Inventors: Kotaro Kawamura, Katsuta; Shinji Ozaki, Funabashi, both of Japan

[73] Assignee: Hitachi, Ltd., Tokyo, Japan

[21] Appl. No.: 234,440

[22] Filed: Feb. 13, 1981

[30] Foreign Application Priority Data

Feb. 15, 1980 [JP] Japan .................................. 55-16607
Feb. 15, 1980 [JP] Japan .................................. 55-16608
Feb. 19, 1980 [JP] Japan .................................. 55-18477

[51] Int. Cl.³ ............................................. H04N 5/78
[52] U.S. Cl. ................................... 360/10.2; 360/10.3
[58] Field of Search ....................... 360/10, 10.1, 10.2, 360/10.3

[56] References Cited

U.S. PATENT DOCUMENTS 3,943,562 3/1976 Opelt ..................................... 360/10
4,143,405 3/1979 Kubota ................................. 360/10

*Primary Examiner*—George G. Stellar
*Attorney, Agent, or Firm*—Antonelli, Terry & Wands

[57] ABSTRACT

In a two-head helical scan type video signal recording and reproducing apparatus, gaps of the two heads are angled to each other to increase a record density. In such an apparatus, when the recorded signal is reproduced while the magnetic tape is stationary, that is, in a still image reproduction mode, the signal on the track recorded by the head having a different gap angle is not reproduced by that head. When the magnetic tape is stopped, the trace locus of the head does not align with the record track, which makes the reproduction of high quality of still image difficult. In the still image reproduction mode, tracking is improved to enable the reproduction of a high quality still image signal by displacing the heads transversely to the direction of trace. Since the absolute value of the deviation of the trace locus of the heads from the record track when the magnetic tape is stationary is known, the heads are laterally displaced by a predetermined signal and the magnetic tape is automatically stopped at a tape position, that is, a stop position of the record track relative to the heads, which assures the reproduction of an optimum still image. To this end, the level of the reproduced signal is detected and the magnetic tape is automatically stopped when the detected level meets a predetermined condition.

16 Claims, 15 Drawing Figures

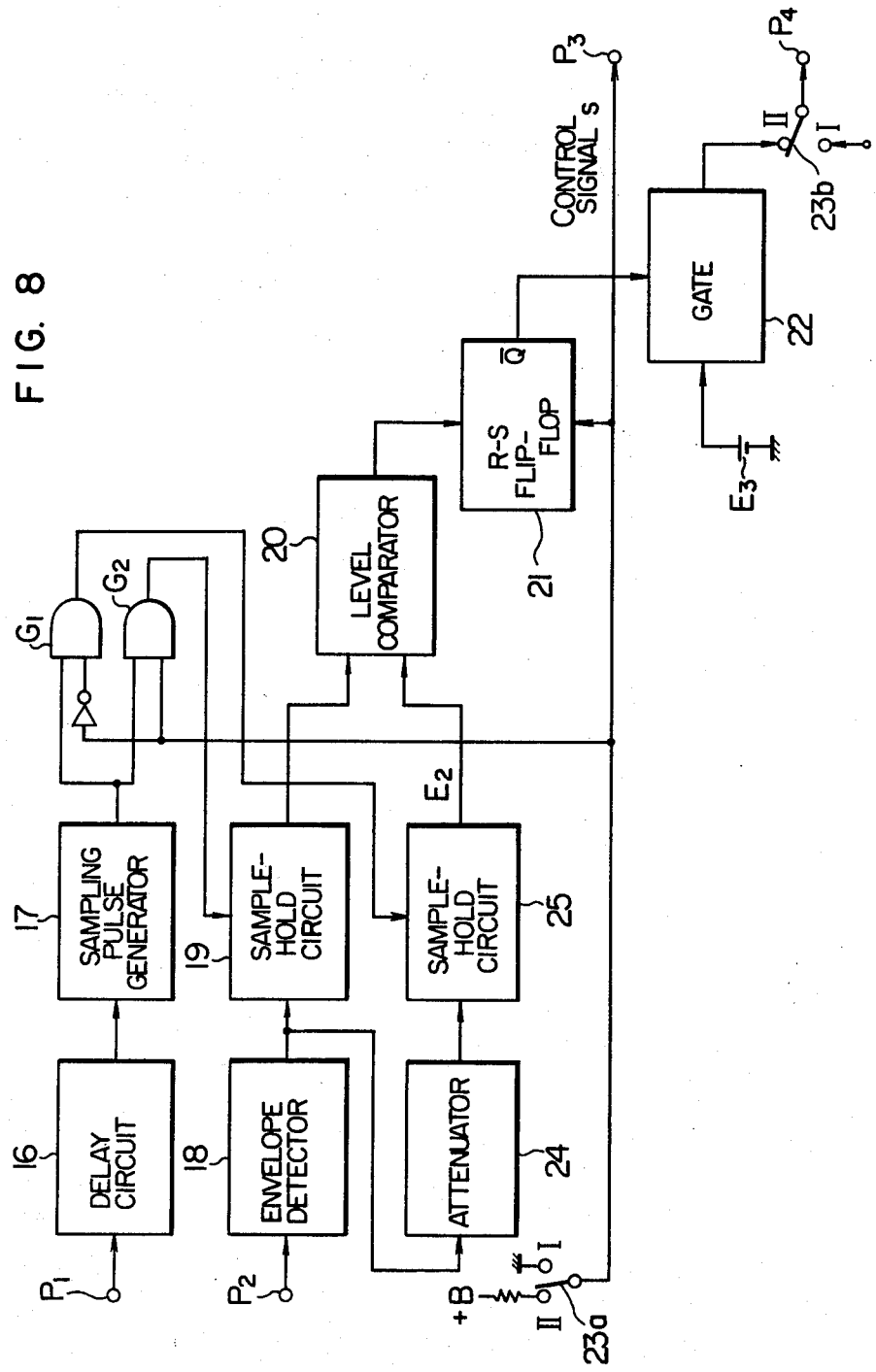

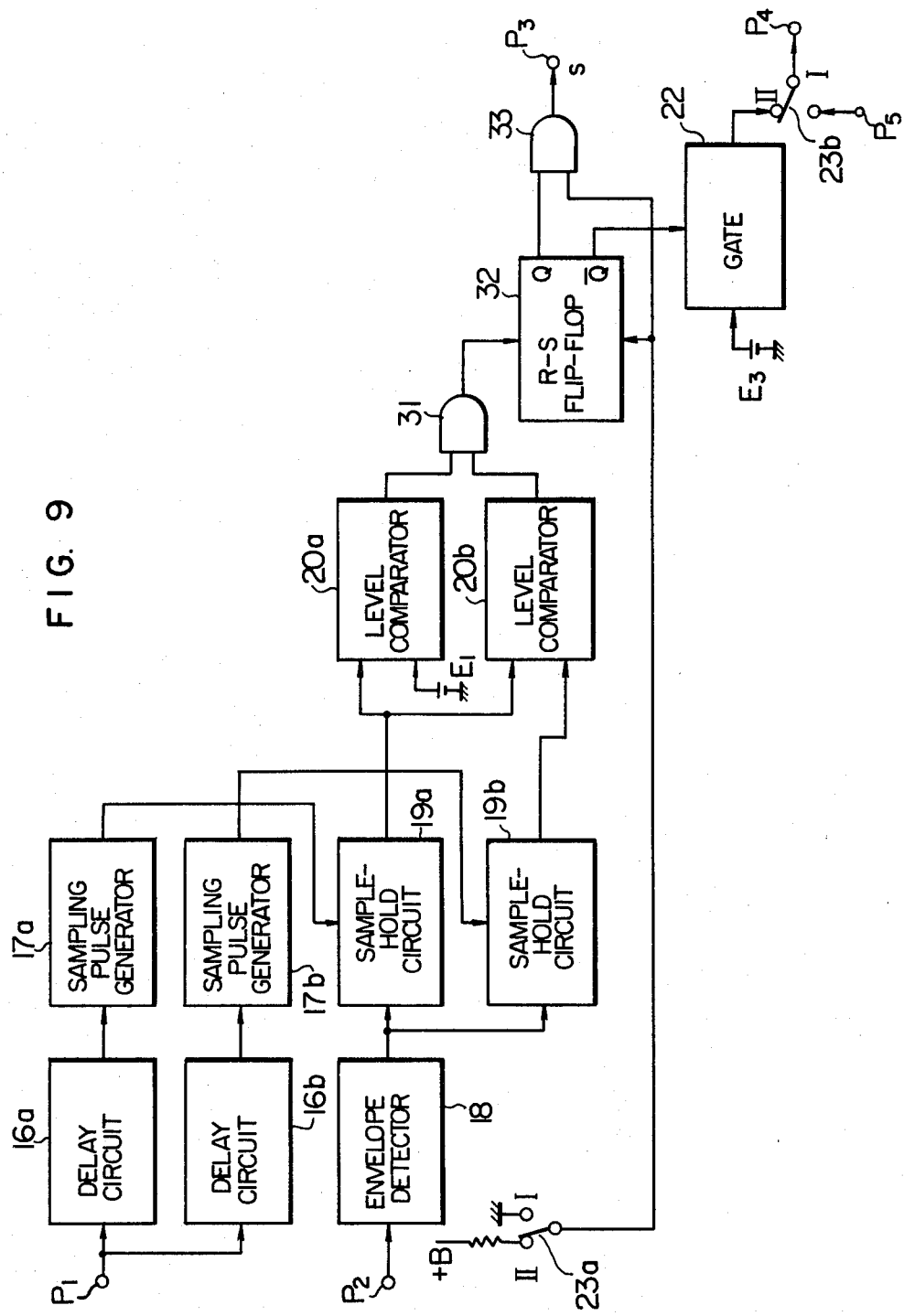

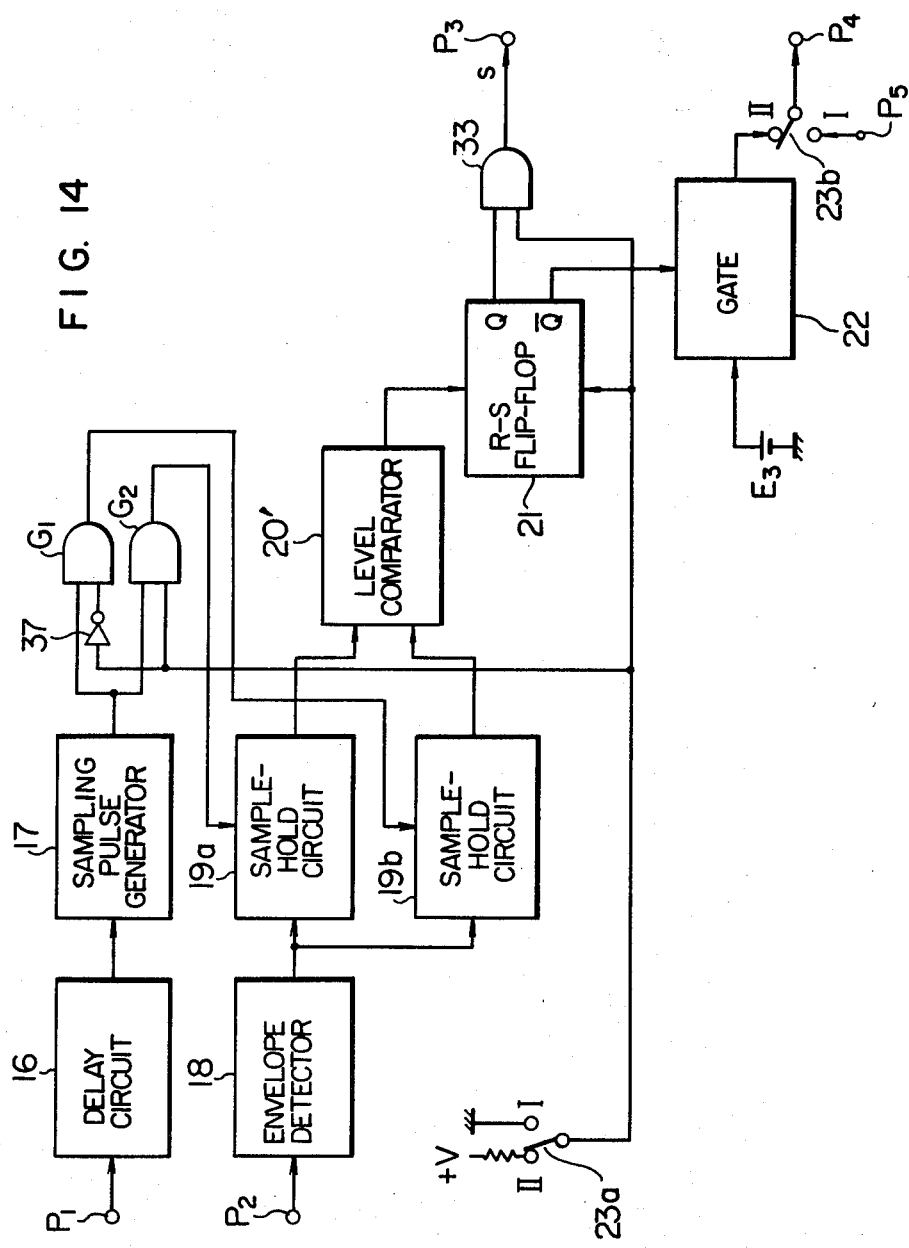

AUTOMATIC TAPE STOP DEVICE FOR VIDEO SIGNAL RECORDING AND REPRODUCING APPARATUS

BACKGROUND OF THE INVENTION

The present invention relates to a helical scan type video signal recording and reproducing apparatus, and more particularly to a technique for automatically stopping a magnetic tape at an optimum tape position to assure reproduction of a high quality image when fast forward movement of the magnetic tape is stopped to reproduce a still image.

In a home video signal recording and reproducing apparatus (hereinafter referred to as a video tape recorder), a two-head helical scan system is used to effectively utilize the magnetic tape and the gaps of the two video heds are angled to each other so that no guard band is produced between record tracks. In the home video tape recorder, it is common to provide a so-called still image reproduction function in which the movement of the magnetic tape is stopped and the same record track is repeatedly reproduced.

In such a video tape recorder, when an image is reproduced while the magnetic tape is stationary, the tracing locus of the video head has an angle to the tape which is essentially different from that of the record track. Since the gaps of the two heads are angled to each other, it is difficult to read the recorded signal over the entire length of the record track, and a portion of the reproduced image is lost or the vertical synchronizing signal is not reproduced, resulting in a disturbance of the synchronization of the reproduced image.

In order to resolve the above problem, it has been proposed to make the width of the video head wider than the width of the record track, that is, to make the track pitch narrower than the width of the video head. With this scheme, even if the trace locus of the video head does not coincide with the direction of the record track, at least a portion of the head passes over the record track and no part of the reproduced signal is lost.

However, a demand for the effective use of the magnetic tape has been increasing, and recording at higher density has been required in recent years. For example, it has been proposed to enable six-hour recording/reproduction in a video tape recorder which uses a two-hour magnetic tape, by reducing the tape movement velocity to one third of a standard tape movement velocity. In such a circumstance, the width of the video head may be 30 microns, for example, and the track pitch in a long time mode is 20 microns. When the track width is narrow, a hig quality signal is not reproduced in the still image reproduction mode unless precision in machining the magnetic tape guide or mechanical parts, such as the cylinder of the head, is very high. Recording and reproduction at the standard velocity are also required. In the above example, the track pitch at the standard velocity is 60 microns. As a result, a 30 microns record track and a 30 microns non-recorded track, that is, a guard band are produced. As a result, in the still image reproduction mode, when the video head traces across the guard band, no signal is reproduced. As a result, useful image cannot be reproduced under such conditions.

SUMMARY OF THE INVENTION

It is an object of the present invention to provide a helical scan type video signal recording and reproducing apparatus which can produce a good still imge reproduction signal, and to provide means for automatically stopping the magnetic tape at an optimum tape position by displacing the video head transversely to the track in response to a predetermined signal in the still image reproduction mode so that a high quality of still image signal is reproduced.

In order to attain the above object, there are provided in accordance with the present invention means responsive to a still image reproduction instruction in a normal reproduction mode to reduce the tape speed to such a level that the magnetic tape is immediately stopped when the tape transport means stops the drive of the magnetic tape and to immediately stop the magnetic tape when the amplitude of a signal read from the video head reaches a predetermined level, and means for displacing the video head transversely to the direction of trace in response to a predetermined signal.

In accordance with the above feature of the present invention, the angular difference between the direction of the video signal record track on the magnetic tape and the direction of the trace locus of the video head when the magnetic tape movement is stopped is compensated by merely displacing the video head transversely to the direction of trace (scan) in response to the predetermined signal so that good tracking is attained. Depending on the tape position at which the magnetic tape is stopped, the compensation may not be attained effectively. This is resolved in accordance with the present invention by automatically stopping the magnetic tape at the optimum tape position. Detection of the optimum tape stop position for the magnetic tape may be effected after the means for displacing the video head transversely to the direction of trace has been operated or without the displacement operation.

BRIEF DESCRIPTION OF THE DRAWINGS

FIG. 3 shows an example of a circuit for generating a signal to displace a video head laterally.

FIG. 8 is a block diagram of another embodiment of the present invention.

FIG. 9 is a block diagram showing a major portion of an embodiment for automatically stopping the magnetic tape at the optimum tape position prior to the lateral displacement of the video head in accordance with the present invention.

FIG. 14 is a block diagram showing a modification of the embodiment shown in FIG. 11.

DESCRIPTION OF THE PREFERRED EMBODIMENTS

Figure 1:
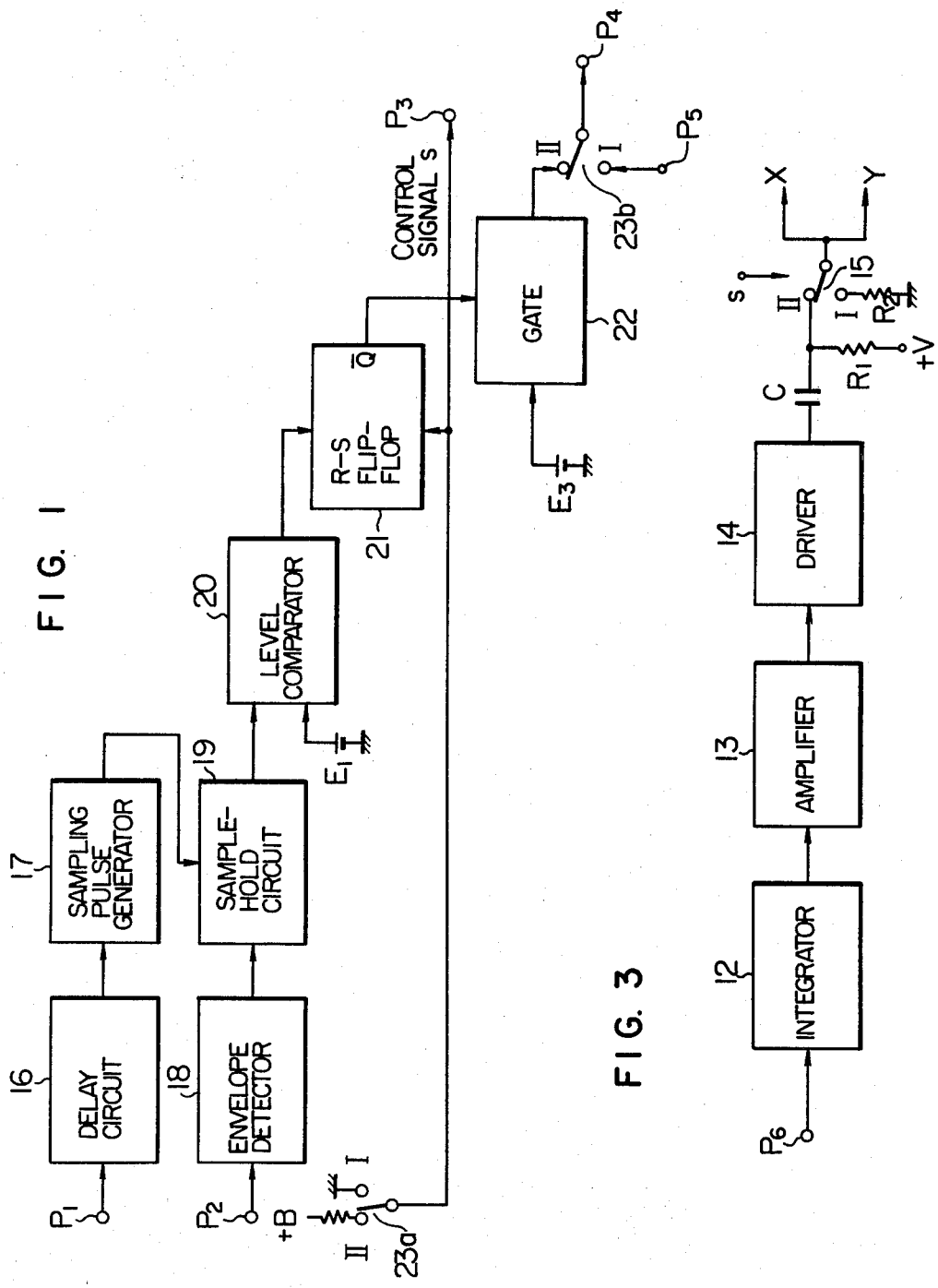
FIG. 1 is a block diagram showing a major portion of one embodiment for automatically stopping a magnetic tape in accordance with the present invention.
Figure 2:
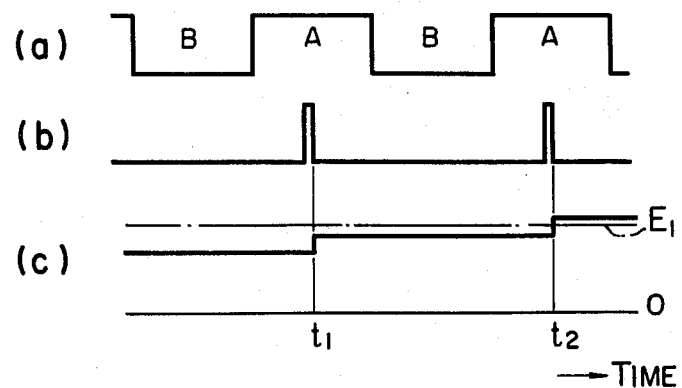
FIG. 2, including a–c, shows waveforms for illustrating the operation of the embodiment shown in FIG. 1.

FIG. 1 shows a block diagram of a major portion of one embodiment of the present invention and FIG. 2 shows waveforms thereof. Applied to a terminal $P_1$ is a head selection pulse shown in FIG. 2(a). The head selection pulse functions to alternately select one of two heads so that each of the two heads is assigned with one field of video signal to read or write one record track of magnetic tape for each field. The head selection signal is generated by a known method based on a signal produced by head position detection means mounted on a rotary head assembly, not shown. In FIG. 2(a), A and B indicate periods in which one of the two video heads A and B (not shown) is active, respectively.

The head selection pulse is delayed by a delay circuit 16, from which it is supplied to a sampling pulse generation circuit 17, which in turn produces a sampling pulse as shown in FIG. 2(b) at a mid-point of the scan period for the head A. This circuit may comprise a monostable multivibrator.

On the other hand, a reproduced RF signal read by the heads A and B is applied to a terminal $P_2$. In the usual video tape recorder, the video signal is recorded in the form of a frequency modulated signal having a frequency band of approximately 1 MHz–several MHz. In the present invention, the reproduced RF signal is defined as a frequency modulated signal read from such a recorded signal. The reproduced RF signal is applied to an envelope detection circuit 18 which envelope-detects the RF signal. It may be a conventional amplitude detection circuit. A detected output is applied to a sample-hold circuit 19 which holds a voltage corresponding to the amplitude of the reproduced RF signal at a mid-point of the scan period for the head A in response to a sampling pulse supplied from the sampling pulse generation circuit 17. The voltage level held is then applied to a level comparator circuit 20. An example of an output waveform of the sample-hold circuit 19 is shown in FIG. 2(c). The level comparator circuit 20 compares the output of the sample-hold circuit 19 with a reference voltage $E_1$ and produces a high level output when the output voltage of the sample-hold circuit 19 is higher than the reference voltage $E_1$.

When ganged switches 23a and 23b are thrown to a standard reproduction contact I, a control signal S produced at a terminal $P_3$ is at a low level. The control signal S at the terminal $P_3$ is used to control a circuit for displacing the video head transversely to the direction of scan, which will be explained later. When the control signal S is at low level, the video head is not displaced and a normal rotary head operation takes place. A terminal $P_4$ coupled to the switch 23b is connected to a capstan drive circuit, not shown. When it is thrown to the standard reproduction contact I, velocity and phase error signals from a servo circuit, not shown, are applied via a terminal $P_5$ to establish a capstan servo loop to effect the tape movement at the standard velocity.

When the switches 23a and 23b are thrown to a still image reproduction contact II, the control signal S assumes a high level which causes an R-S flip-flop 21 to reset so that a $\overline{Q}$-output of the R-S flip-flop 21 assumes a high level to open a gate 22. As a result, a motor drive voltage $E_3$ is applied to the capstan drive circuit through the gate 22 and the contact II of the switch 23b. The motor drive voltage $E_3$ is preset to such a voltage level that the tape velocity is slower than the standard velocity, so that the tape movement will be immediately stopped when the application of this voltage is interrupted. The sample-hold circuit 19, the level comparator circuit 20 and the gate 22 may be of well-known circuit configuration.

Figure 4:
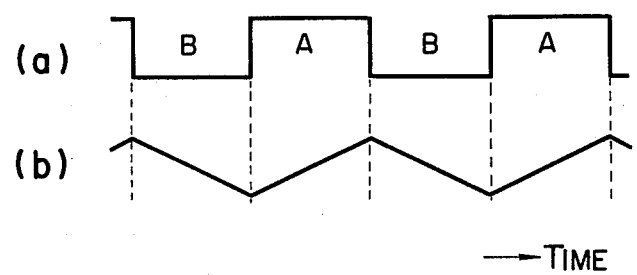
FIG. 4, including a and b shows waveforms for illustrating the operation of the circuit shown in FIG. 3.
Figure 5:
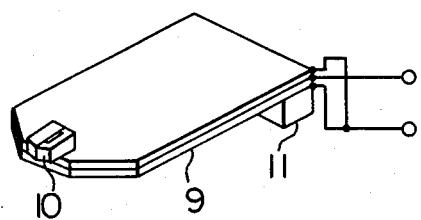
FIG. 5 shows an example of a structure of means for displacing the video head laterally by a bimorph plate.

Since the control signal at the terminal $P_3$ now assumes the high level, the circuit for displacing the head transversely to the direction of scan (lateral displacement) becomes active. An example of the circuit for laterally displacing the head is shown in FIG. 3, and waveforms for explaining the operation thereof are shown in FIG. 4. Numeral 12 denotes an integration circuit comprising a Miller integrator to which a head selection pulse shown in FIG. 4(a), which is similar to that shown in FIG. 2(a), is applied via a terminal $P_6$. The head selection pulse is integrated by the integration circuit 12 so that it is converted to a triangular wave as shown in FIG. 4(b). The triangular wave is amplified to a desired amplitude by an amplifier circuit 13 and further amplified by a drive circuit 14 to a voltage level sufficient to drive a bimorph plate at an end of which the video head is mounted. The bimorph plate on which the video head is mounted may be structured as shown in FIG. 5 in which the magnetic head 10 is mounted at the end of the bimorph plate 9 which comprises two ceramic plates of opposite polarization polarities bonded together. The other end of the bimorph plate 9 is fixed to a base 11 which in turn is fixed to a rotary disc or rotary cylinder (not shown) to form a rotary head assembly. A pair of such bimorph plates 9 each having the magnetic head 10 mounted thereon as shown in FIG. 5 are prepared and fixed to the rotary disc or rotary cylinder at a spacing of 180 degrees. A switch 15 selects its contacts depending on the level of the control signals explained above. It selects the contact I when the control signal S is at low level (i.e. in the standard reproduction mode) so that no voltage is applied to the bimorph plates 9 and the video head is not displaced. When the control signal S is at high level (i.e. in the still image reproduction mode), the switch 15 selects the contact II so that the output voltage of the drive circuit 14 is applied to the pair of bimorph plates 9 through a capacitor C and output terminals X and Y, respectively. The capacitor C is provided to block a D.C. component of the triangular wave. A D.C. voltage V is added thereto through a resistor $R_1$ to change the lateral displacement of the head. The pair of bimorph plates 9 are arranged such that they are displaced oppositely to each other for a given polarity of applied voltage.

The operation for effecting desired tracking of the video head when the magnetic tape is stopped by applying the signal derived from the circuit shown in FIG. 3 to the means for laterally displacing the video head is now explained.

Figure 6:
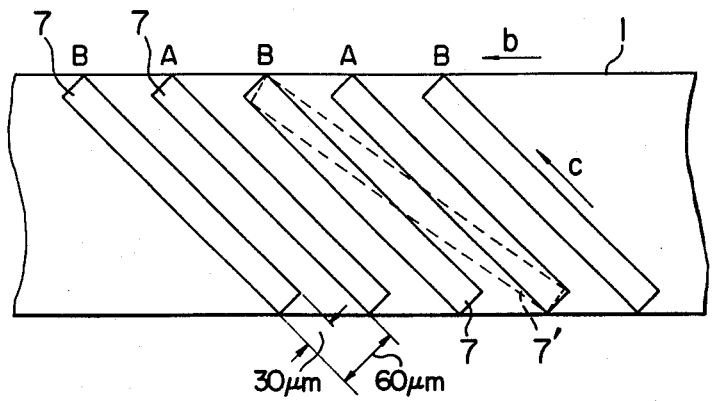
FIG. 6 shows a pattern illustrating a relationship between a record track of the magnetic tape and a trace locus of the video head.

By way of example, FIG. 6 shows a pattern of record tracks of the magnetic tape recorded in the standard operation mode in an apparatus which is capable of selectively operating at a standard recording/reproducing speed and a speed which is three times as high as the standard speed. This corresponds to the case explained above in which the width of the video head is 30 microns and the track pitch is 60 microns. In FIG. 6, numeral 7 denotes the record tracks of which A denotes the tracks recorded by one of the two video heads and B denotes the tracks recorded by the other video head. It is assumed that the magnetic tape 1 moves in the direction shown by an arrow b while the video heads scan in the direction shown by an arrow c. When the movement of the magnetic tape 1 is stopped, a locus 7' shown by broken lines, for example, defines a trace locus of the video heads. When there is no lateral displacement between the two video heads, the trace loci of the two video heads coincide and takes the path indicated by the locus 7'. When the video heads scan in a manner shown in FIG. 6, the video head B produces no reproduced output in the first half of the scan period because the track recorded by the video head B of the record tracks 7 is not scanned, but a reproduced output is produced in the second half of the scan period and a maximum reproduced output is produced immediately before the end of the scan period. For the video head A, the reproduced output decreases from a maximum level in the first half of the scan period and no reproduced output is produced in the second half of the scan period.

Figure 7:
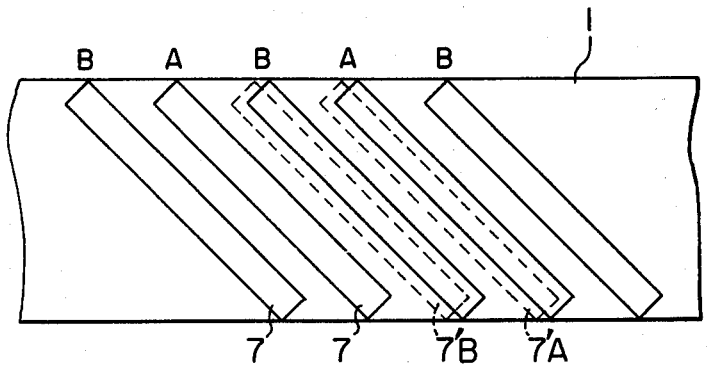
FIG. 7 shows a pattern illustrating a relationship between the record track and the trace locus of the video head when the video head has been displaced laterally.

By laterally displacing the video heads in response to the correction signal shown in FIG. 4(b), the head A is raised more as the scan proceeds and the head B is lowered most at the beginning of the scan and the displacement decreases as the scan proceeds. By laterally displacing the heads in this manner, a relationship between the record track of the magnetic tape 1 and the trace locus of the video head when the magnetic tape is stationary is given by a pattern shown in FIG. 7, in which 7'A denotes the trace locus of the video head A and 7'B denotes the trace locus of the video head B.

As shown, the record track 7 and the trace loci 7'A and 7'B of the video heads when the magnetic tape 1 is stationary are parallel. When the movement of the magnetic tape 1 is stopped, there is no assuarance that the record track completely coincides with the trace locus when the movement of the magnetic tape is merely stopped to effect the still image reproduction because the stop position of the magnetic tape is not fixed.

Means for establishing the tape stop position such that the record track completely coincides with the trace locus of the head is shown in FIG. 1.

When the switches 23a and 23b are thrown to the still image reproduction contacts from the standard reproduction contacts, the control signal S assumes the high level as explained above so that the tape velocity is switched to low speed, and the switch 15 in FIG. 3 is also thrown to the contact II so that the bimorph plates 9 are displaced to render the record track to be substantially parallel to the trace locus of the video head. Immediately after the switching from the standard velocity operation to the still image reproduction mode, the record track usually misaligns with the trace locus of the video head so that a level of the reproduced RF signal is low. As a result, the output of the sample-hold circuit 19 is at a low level as shown in a period prior to time $t_1$ in FIG. 2(c). When the video head aligns with the record track as the tape is moved at the low speed, the amplitude of the reproduced RF signal increases and the output of the sample-hold circuit 19 reaches a maximum level as shown in a period after time $t_2$ in FIG. 2(c). By presetting the level of the reference voltage $E_1$ to a value somewhat lower than the output of the sample-hold circuit 19 at the time when the reproduced RF signal reaches the maximum level, the output of the level comparator circuit 20 assumes the high level when the output of the sample-hold circuit 19 exceeds the reference voltage $E_1$. As a result, the high level output causes the R-S flip-flop to set so that the $\overline{Q}$-output thereof assumes the low level, which closes the gate 22 to block the supply of the capstan motor drive voltage $E_3$ to stop the tape movement. In this manner, the magnetic tape is automatically stopped at the tape position where the record track aligns with the trace locus of the video head. Consequently, a high quality of noise-free still image reproduction signal can be produced. While the circuits for demodulating the reproduced RF signal read from the video head and for processing the signal are not shown, it should be understood that a processing circuit similar to that used in a conventional video tape recorder may be used.

In the above explanation, the recording mode in which guard bands are produced on the magnetic tape was described. Where no guard band is produced such as when the tape is moved at a speed which is one third of the standard speed so that the record tracks A and B come close to each other to produce narrow tracks of approximately 20 microns, the lateral displacement of the video heads by the bimorph plates may be smaller than that explained above and the present invention is equally applicable even to such an instance. In this case, the gain of the amplifier circuit 13 for the triangular wave shown in FIG. 3 and the magnitude of the D.C. voltage V applied to the resistor $R_1$ are to be changed in response to the tape mode selection so that the amount of the lateral movement of the video heads is reduced.

In the embodiment shown in FIG. 1, the reference voltage $E_1$ applied to the level comparator circuit 20 is fixed to a predetermined level. FIG. 8 shows an embodiment in which the magnetic tape is automatically stopped at the tape position which assures the reproduction of high quality of still image even when the level of the reproduced RF signal varies substantially such as when different types of magnetic tape are used or a magnetic tape recorded by a different video tape recorder is to be reproduced. In the embodiment of FIG. 8, the level of the reference voltage $E_1$ is not fixed but the level of the reproduced RF signal detected in the standard reproduction mode is held to utilize it as the reference voltage.

In FIG. 8, the blocks having the same numerals as those shown in FIG. 1 have the same functions and they are not explained here. Numeral 25 denotes a sample-hold circuit for generating the reference voltage. The output of the envelope detection circuit 18 is branched to an attenuator circuit 24 where it is level-attenuated and the output of the attenuator circuit 24 is supplied to the sample-hold circuit 25, to which is applied the sampling pulse generated by the sampling pulse generation circuit 17 through a gate $G_1$ which is opened when the control signal S is at the low level, that is, in the normal reproduction mode, to activate the sample-hold circuit 25. When the switches 23a and 23b are thrown to select the still image reproduction mode and the control signal S assumes the high level, one input to the AND gate $G_1$ assumes the low level through the function of an inverter so that the gate $G_1$ is closed to block the supply of the sampling pulse to the sample-hold circuit 25. As a result, a level $E_2$ which is somewhat lower than the level of the envelope-detected reproduced RF signal is held. The sampling pulse is supplied to the sample-hold circuit 19 through an AND gate $G_2$ which is opened when the control signal S assumes the high level so that the operations similar to that in the circuit of FIG. 1 are carried out. The present embodiment is the same as the embodiment of FIG. 1 except that the fixed reference voltage $E_1$ is replaced by the reference voltage $E_2$ which varies in accordance with the level of the reproduced RF signal read from the recorded tape.

In the above two embodiments, when the still image reproduction mode is called for, the video heads are immediately displaced laterally so that they are aligned in parallel to the record tracks and then the magnetic tape is automatically stopped at the optimum tape position. Alternatively, the magnetic tape may first be stopped at the optimum tape position when the still image reproduction is instructed and then the video heads may be laterally displaced to effect complete tracking. An embodiment therefor is now explained.

Figure 10:
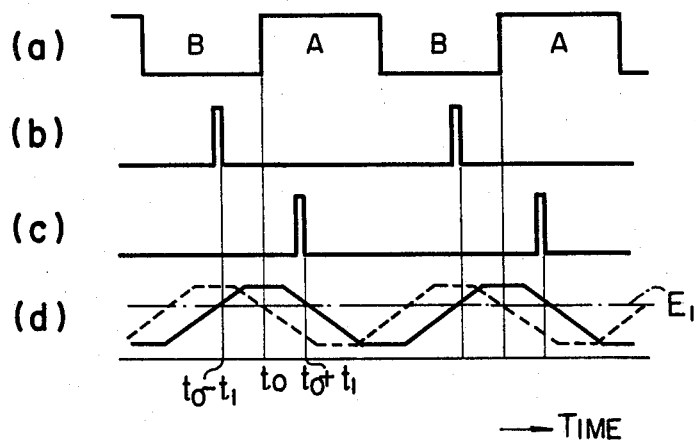
FIG. 10, including a–d, shows waveforms for illustrating the operation of the embodiment shown in FIG. 9.

FIG. 9 shows a major portion of one embodiment for performing the above operation, and FIG. 10 shows signal waveforms for explaining the operation. A head selection pulse shown in FIG. 10(a) is applied to the terminal $P_1$ and it is supplied to delay circuits 16a and 16b, from which the delayed pulses are supplied to sampling pulse generation circuits 17a and 17b. At time $t_o$, the heads are switched from the head B to the head A. Then, the sampling pulse generation circuits 17a and 17b produce the sampling pulses at times $t_o - t_1$ and $t_o + t_1$, respectively.

On the other hand, the reproduced RF signal applied to the terminal $P_2$ is envelope-detected by the envelope detection circuit 18 and the detected output is applied to the sample-hold circuits 19a and 19b. The outputs therefrom are compared in a level comparator circuit 20b, which produces a high level output when two input voltages are equal and produces a low level output when they are not equal. The output of the sample-hold circuit 19a is compared with the reference voltage $E_1$ in a level comparator circuit 20a, which produces a high level output when the output of the sample-hold circuit 19a is higher than the reference voltage $E_1$.

When the switches 23a and 23b select the normal reproduction mode contacts I, the output of an AND gate 33, that is, the control signal S, assumes the low level so that the switch 15 shown in FIG. 3 selects the contact I and zero voltages X and Y are applied to the pair of bimorph plates. At the same time, velocity and phase error signals from the servo circuit, not shown, are applied from the terminal $P_5$ to the output terminal $P_4$ connected to the capstan motor drive circuit to close the servo loop to effect the normal speed reproduction.

When the switches 23a and 23b are thrown to the still image reproduction mode contacts II, an R-S flip-flop 32 is reset and the $\overline{Q}$-output thereof assumes a high level to open the gate 22. As a result, the motor drive voltage $E_3$ is applied to the capstan motor drive circuit through the gate 22 so that the tape moves at a predetermined low speed.

At this moment, the envelope of the reproduced RF signal is as shown by the broken line curve in FIG. 10(d). When it reaches a solid line curve as the tape moves, the potentials of the envelope at the two sampling points become equal to each other. Consequently, the level comparator circuit 20b produces a high level output. Since the envelope at the time $t_o - t_1$ is higher than the reference potential $E_1$, the level comparator circuit 20a also produces the high level output so that the output of the AND gate 31 assumes the high level, which sets the R-S flip-flop 32. As a result, the $\overline{Q}$-output thereof assumes the low level to close the gate 22 so that no voltage is applied to the output terminal $P_4$ connected to the capstan motor drive circuit and the tape immediately stops. The relation between the tape stop position and the magnetic heads is illustrated in FIG. 6 in which the magnetic head A scans the record track in the beginning of the scan period while the magnetic head B scans the record track at the end of the scan period.

At the same time, the output of the AND gate 33 assumes the high level so that the control signal S at the terminal $P_3$ assumes the high level to throw the switch 15 shown in FIG. 3 to the contact II. The triangular wave as shown in FIG. 4(b) is applied to the pair of bimorph plates through the output terminals X and Y. As a result, the video head A exactly traces the track A only, while the video head B exactly traces the track B only, and a high quality noise-free still image signal is reproduced.

When the tape stop position is such that the head scans the track B at the beginning of the scan period and scans the track A at the end of the scan period, the output levels of the two sample-hold circuits are also equal and the level comparator 20b produces the high level output. However, the tape is not stopped in this instance by selecting the reference voltage $E_1$ or the time $t_1$ at which the sampling pulse is generated such that the envelope potentials at times $t_o - t_1$ and $t_o + t_1$ do not exceed the reference potential $E_1$.

In the embodiment shown in FIG. 9, the magnetic tape is stopped by detecting the tape position at which the video heads scan across the beginning of one record track to the end of another record track. Alternatively, the magnetic tape may be stopped at a tape position at which the trace locus of the video head coincides with one of the record tracks at the center thereof. An embodiment therefor is now explained.

Figure 11:
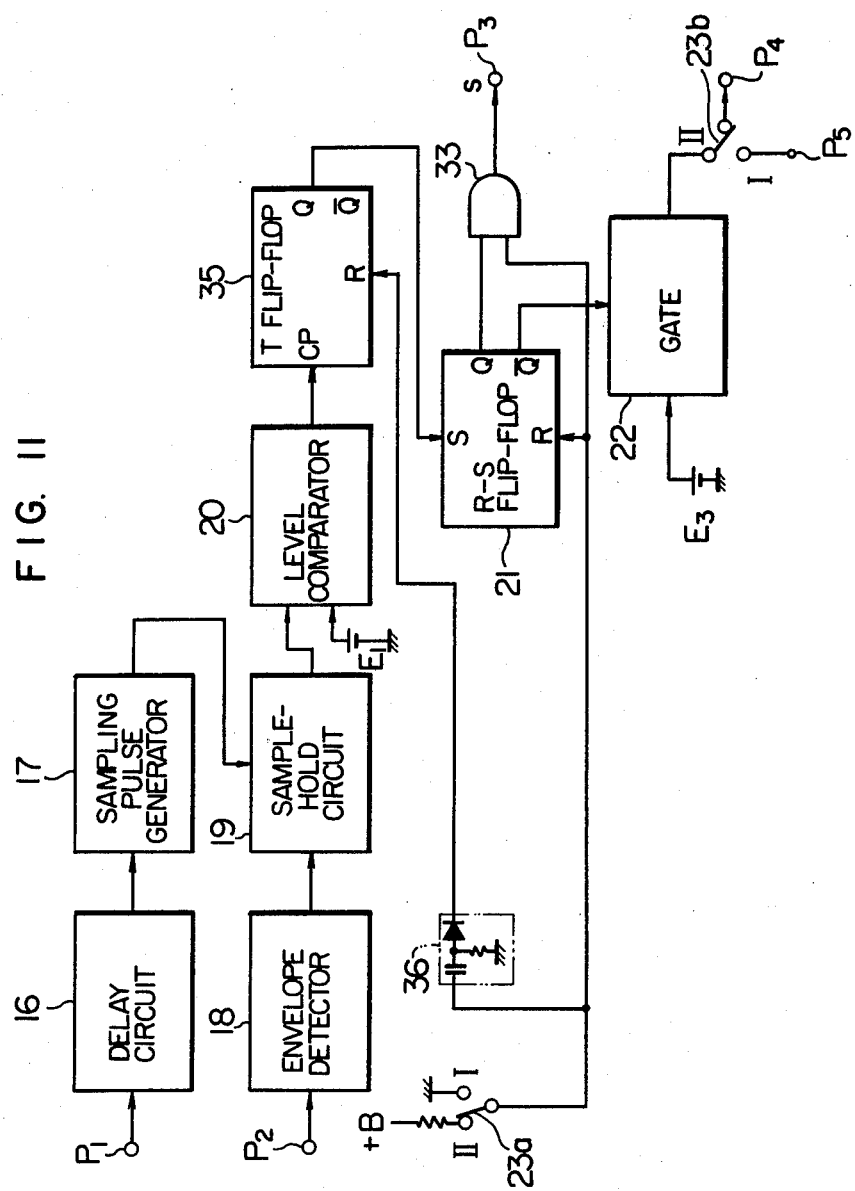
FIG. 11 is a block diagram showing a major portion of an embodiment for stopping the magnetic tape at a different position than that in FIG. 9.

FIG. 11 shows an embodiment in which when the still image reproduction mode is called for the tape is stopped at such a position that the trace locus of the video head coincides with one of the record tracks at the center thereof.

Figure 12:
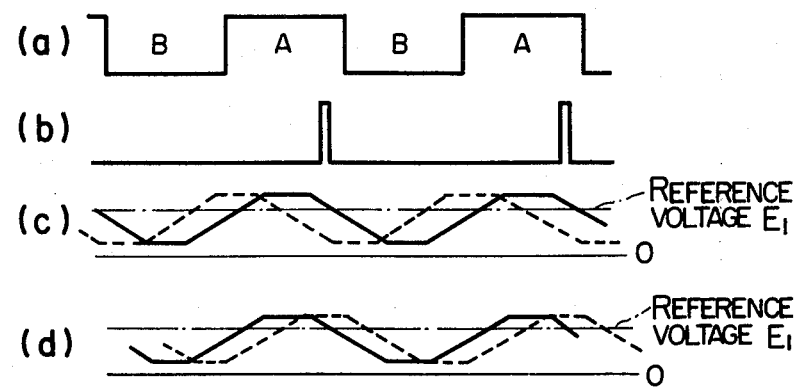
FIG. 12, including a–d, shows waveforms for illustrating the operation of the embodiment shown in FIG. 11.

Like in the embodiments described above, a head selection pulse shown in FIG. 12(a) is applied to the terminal $P_1$. It is delayed in the delay circuit 16 and then applied to the sampling pulse generation circuit 17 which produces the sampling pulse as shown in FIG. 12(b). The reproduced RF signal applied to the terminal $P_2$ is envelope-detected by the envelope detection circuit 18 which produces the detected output as shown in FIG. 12(c), which in turn is applied to the sample-hold circuit 19. The output therefrom is compared with the reference voltage $E_1$ by the level comparator 20, which produces the high level output when the output of the sample-hold circuit 19 is higher than $E_1$.

When the switches 23a and 23b select the normal reproduction mode contacts I, the output of the AND gate 33 assumes the low level so that the control signal S at the terminal $P_3$ assumes the low level. As a result, no voltage is applied to the bimorph plates for laterally displacing the heads, like in the previous embodiments. The velocity and phase error signals are supplied from the servo circuit, not shown, to the capstan motor drive circuit so that the servo loop is closed to effect the normal speed reproduction.

When the switches 23a and 23b are thrown to the still image reproduction mode contacts II, a differentiation circuit 36 generates an impulse signal, which resets a T flip-flop 35. The R-S flip-flop 21 is also reset because the high level potential is applied to the reset terminal thereof through the switch 23a. As a result, the $\overline{Q}$-output of the R-S flip-flop 21 assumes the high level to open the gate 22. Thus, the constant motor drive voltage $E_3$ is applied to the capstan motor drive circuit, not shown, from the terminal $P_4$ through the gate 22 so that the capstan motor goes out of the servo control and the tape moves at the predetermined low speed. At this time, the envelope of the reproduced RF signal is as shown by the broken line curve in FIG. 12(c), in which the detected level at the sampling pulse position is lower than the reference voltage. When it reaches a solid line curve as the tape moves, the level comparator circuit 20 produces a high level output so that the Q-output of the T flip-flop 35 assumes the high level to set the R-S flip-flop 21. As a result, the Q-output thereof assumes the low level to close the gate 22 so that the drive voltage is blocked and the tape stops. Since the output of the AND gate 33 assumes the high level, the control signal S assumes the high level so that a voltage is applied to the bimorph plates to laterally displace the video heads to effect good still image reproduction.

Figure 13:
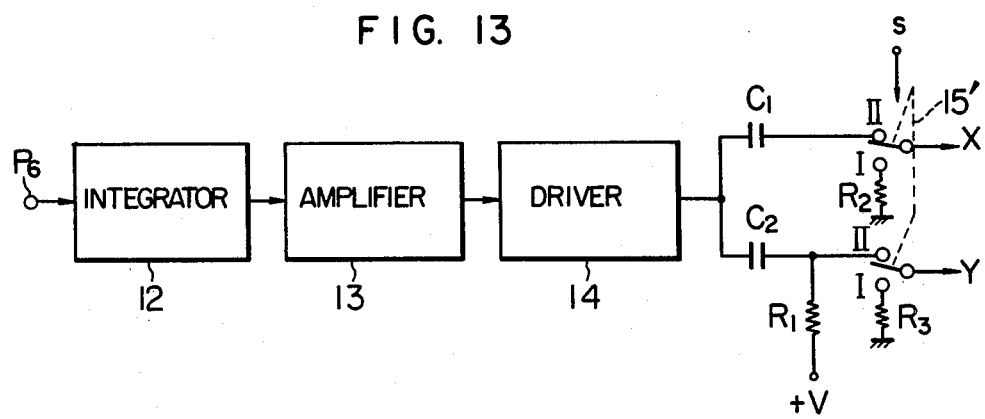
FIG. 13 is a block diagram showing another example of a drive circuit for laterally displacing the video head.

Unlike in the previous embodiments, the positional relationship between the trace locus of the video head and the record track when the magnetic tape is stopped is such that the trace locus of the video head coincides with one of the record tracks at the center thereof. Consequently, the manner of laterally displacing the video head needs to be modified. For example, when the trace locus coincides with the record track A at the center thereof, the video head A is not displaced at the mid-point of the scan and is displaced oppositely by an equal amount at the beginning and the end of the scan. The video head B is displaced at the beginning and the end of the scan in the opposite sense to the displacement of the video head A and also is shifted by one track pitch over the entire scan. In order to impart such displacements, the circuit shown in FIG. 3 is modified as shown in FIG. 13, which differs from the circuit of FIG. 3 in that the triangular wave output X applied to the bimorph plate for one of the video heads is supplied to the drive circuit 14 through a capacitor $C_1$ in order to block a D.C. component, and means for adding a D.C. voltage V to the triangular wave output Y is provided at a following stage to a capacitor $C_2$ in order to permanently impart one track pitch of displacement to the bimorph plate for the other video head. A double-throw switch 15' is actuated by the control signal S and has the same function as the switch 15 shown in FIG. 3.

In the embodiment shown in FIG. 11, the timing of the sampling pulse is selected with respect to the magnitude of the reference voltage $E_1$ by adjusting the delay time of the delay circuit 16 such that when a maximum level of the envelope of the reproduced RF signal reaches the mid-point of the scan, that is, the center of the head selection pulse, the output of the level comparator circuit 20 assumes the high level.

It is assumed that when the switches 23a and 23b are thrown to the still image reproduction mode contact II, the envelope detected output signal is as shown by the broken line curve in FIG. 12(d). Under such a condition, the circuit of FIG. 11 operates in the following manner.

When the switch 23a is thrown to the still image reproduction mode contact II, the T flip-flop 35 and the R-S flip-flop 21 are both reset for the reason described above so that the Q-output of the T flip-flop 35 assumes the low level while the $\overline{Q}$-output of the R-S flip-flop 21 assumes the high level. As a result, the gate 22 is opened and the motor drive voltage $E_3$ is applied to the output terminal $P_4$ connected to the capstan motor drive circuit, through the gate 22. Thus, the tape is moved at a slow speed, and when the output of the envelope detection circuit 18 reaches a solid line curve shown in FIG. 12(d), the output of the level comparator circuit 20 changes from the low level to the high level so that Q-output of the T flip-flop 35 assumes the high level. As a result, the R-S flip-flop 21 is set and the Q-output thereof assumes the high level while the $\overline{Q}$-output assumes the low level to close the gate 22. In this manner, the tape is stopped with the envelope output condition as shown by the solid line in FIG. 12(d). That is, the tape is stopped with the condition shown by the solid line in FIG. 12(c).

In accordance with the present embodiment, the tape is stopped at the same position whenever the switches 23a and 23b are switched from the normal mode to the still mode.

Figure 15:
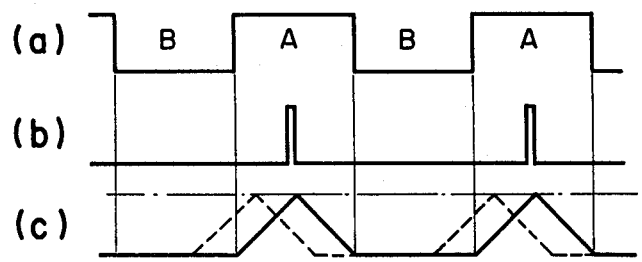
FIG. 15, including a–c, shows waveforms for illustrating the operation of the circuit shown in FIG. 14.

FIG. 14 shows another embodiment of a similar function and FIG. 15 shows waveforms for explaining the operation. When the switches 23a and 23b are connected to the normal reproduction mode contacts I, the reproduction at the normal speed is carried out like that of the embodiment shown in FIGS. 11 and 12. The sampling pulse generation circuit 17 produces a sampling pulse at the mid-point of the sampling period for one of the heads, as shown in FIG. 15(b). The sampling pulse is applied to the sample-hold circuit 19b through the gate $G_1$; consequently, the sample-hold circuit 19a produces and holds a constant voltage output as shown by a chain line in FIG. 15(c).

When the switches 23a and 23b are thrown to the still image reproduction mode contacts II, the sampling pulse from the sampling pulse generation circuit 17 is applied to the sample-hold circuit 19a through the gate $G_2$. When the output of the sample-hold circuit 19a becomes equal to the output of the sample-hold circuit 19b, the level comparator circuit 20' produces a high level output so that the tape is stopped in the same manner as described in connection with FIG. 11. At the same time, the switch 15' shown on FIG. 13 is thrown to the contact II so that the voltage is applied to the bimorph plates to effect noise bar-free still image reproduction.

We claim:

1. In a helical scan type video signal recording and reproducing apparatus having at least one rotary video head, an automatic tape stop device for stopping a magnetic tape to produce a still image reproduction signal, comprising:

means for displacing said video head transversely to the direction of scan in response to a predetermined signal;

means responsive to an instruction for a still image reproduction mode to change the velocity of said magnetic tape to a velocity lower than that in a normal reproduction mode;

detection means for detecting the level of the reproduced signal read from said magnetic tape by said video head;

tape stopping means for stopping the movement of said magnetic tape when said level detected by said detection means meets a predetermined condition; and control means for controlling the start of the operation of said means for displacing said video head transversely to the direction of scan.

2. An automatic tape stop device according to claim 1 wherein said control means includes means responsive to the instruction for the still image reproduction mode for immediately activating said means for displacing said video head.

3. An automatic tape stop device according to claim 1 wherein said control means includes means for initiating the operation of said means for displacing said video head after said magnetic tape has been stopped.

4. An automatic tape stop device according to claim 1 wherein said means for stopping said magnetic tape includes means for comparing said detected level with a predetermined reference voltage to stop the drive of said magnetic tape when said detected level reaches said reference voltage.

5. An automatic tape stop device according to claim 1 wherein said means for stopping said magnetic tape includes means for detecting and holding a level corresponding to an amplitude of the reproduced signal read in the normal speed tape run, and means for comparing the level of said reproduced signal detected by said level detection means when the magnetic tape speed is reduced after the instruction for the still image reproduction mode with said level held by said level detection and hold means to stop the movement of said magnetic tape when said detected level reaches said held level.

6. An automatic tape stop device according to claim 1, 2, 3, 4 or 5 wherein said means for detecting the level of the reproduced signal includes means for detecting the level of the reproduced signal at a predetermined time during a scan period of said video heads.

7. An automatic tape stop device according to claim 1, 2, 3, 4, or 5 wherein said apparatus includes two rotary video heads and said means for displacing said video heads includes means for displacing said video heads in response to a triangular wave derived by integrating a head selection pulse for selecting one of said video heads.

8. An automatic tape stop device according to claim 1, 2, 3, 4, or 5 wherein said apparatus includes two video heads and said means for detecting the level of the reproduced signal includes means for detecting the level of the reproduced signal for only one of said video heads.

9. An automatic tape stop device for a helical scan type video signal recording and reproducing apparatus having at least one rotary video head which is adapted to obtain a still image reproduction signal recording on a magnetic tape by stopping the magnetic tape, comprising:

means responsive to an instruction for reproducing a still image for changing the speed of said magnetic tape to a slower speed than its normal speed for reproduction;

means for generating a gate pulse when said video head is tracing an intermediate portion between both ends of a recording track on said magnetic tape;

means for detecting an envelope of the reproduction signal read from said magnetic tape by said video head when said magnetic tape is running at the slower speed, and for sample-holding the level of said detected envelope in response to said gate pulse;

means for comparing said sample-held level with a predetermined reference level and for producing an output signal when said sample-held level is higher than said reference level; and means responsive to said output signal of said comparing means for stopping said magnetic tape.

10. An automatic tape stop device according to claim 9 further comprising:

means for generating a reference signal whose level is determined on the basis of the level of the reproduction signal read by said video head when said tape is running at the normal speed; and means responsive to an instruction for reproducing a still image for applying said reference signal to said comparing means as said reference level.

11. In a helical scan type video signal recording and reproducing apparatus having at least one rotary video head, an automatic tape stop device for stopping a magnetic tape to produce a still image reproduction signal, comprising:

means responsive to an instruction for a still image reproduction mode to change the velocity of said magnetic tape to a velocity lower than that in a normal reproduction mode;

detection means for detecting the level of the reproduced signal read from said magnetic tape by said video head; and tape stopping means for stopping the movement of said magnetic tape when said level detected by said detection means meets a predetermined condition, including means for comparing said detected level with a predetermined reference voltage to stop the drive of said magnetic tape when said detected level reaches said reference voltage.

12. An automatic tape stop device according to claim 11 further comprising:

means for generating a reference signal whose level is determined on the basis of the level of the reproduction signal read by said video head when said tape is running at the normal speed; and means responsive to an instruction for reproducing a still image for applying said reference signal to said comparing means as said reference level.

13. An automatic tape stop device according to claim 11 wherein said means for stopping said magnetic tape includes means for detecting and holding a level corresponding to an amplitude of the reproduced signal read in the normal speed tape run, and means for comparing the level of said reproduced signal detected by said level detection means when the magnetic tape speed is reduced after the instruction for the still image reproduction mode with said level held by said level detection and hold means to stop the movement of said magnetic tape when said detected level reaches said held level.

14. An automatic tape stop device according to claims 11, 12, or 13 wherein said apparatus includes two video heads and said means for detecting the level of the reproduced signal includes means for detecting the level of the reproduced signal for only one of said video heads.

15. An automatic tape stop device according to claim 11, further comprising means for displacing said video head transversely to the direction of scan in response to a predetermined signal, and control means responsive to the instruction for the still image reproduction mode for immediately activating sad means for displacing said video head.

16. An automatic tape stop device according to claim 11, further comprising means for displacing said video head transversely to the direction of scan in response to a predetermined signal, and control means responsive to said tape stopping means for initiating the operation of said means for displacing said video head after said magnetic tape has been stopped.

* * * * *